US006784842B2

(12) United States Patent
Vesuna

(10) Patent No.: US 6,784,842 B2
(45) Date of Patent: Aug. 31, 2004

(54) METHOD AND SYSTEM FOR CALIBRATING A LOCATION SYSTEM

(75) Inventor: Sarosh Vesuna, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/349,631

(22) Filed: Jan. 22, 2003

(65) Prior Publication Data

US 2004/0140931 A1 Jul. 22, 2004

(51) Int. Cl.[7] ............................................. G01S 3/02
(52) U.S. Cl. ...................................... 342/463; 342/465
(58) Field of Search ................................. 342/465, 463

(56) References Cited

U.S. PATENT DOCUMENTS 5,977,913 A * 11/1999 Christ ........................ 342/465

OTHER PUBLICATIONS

"Enhancements to the RADAR User Location and Tracking System" by Bahl et al.; *Microsoft Research* and *University of California at San Dieago*; pp. 1–13.

"User Location and Tracking in an In–Building Radio Network" by Paramvir Bahl; *Microsoft Research, Technical Report*, Feb. 1999, pp. 1–12.

* cited by examiner

Primary Examiner—Theodore M. Blum
(74) Attorney, Agent, or Firm—Baker Botts L.L.P.

(57) ABSTRACT

The present invention is useful in connection with calibration of a wireless location system based on RF signals within a facility. Identification devices are provided at fixed locations which are selected within the facility. The RF environment is sampled at selected locations and data representing the sampled RF environment and the corresponding selected location is provided to a computer which maintains a database corrolating the RF environment data and the selected locations to be used with calibrating a location system.

13 Claims, 4 Drawing Sheets

METHOD AND SYSTEM FOR CALIBRATING A LOCATION SYSTEM

BACKGROUND OF THE INVENTION

This invention relates to location systems based on radio frequency ("RF") signals, and in particular to such systems that are based on RF signals capable of providing data communications within a facility.

In connection with location systems based on RF signals, particularly if the system is based on time of arrival of RF signals, it is desirable to calibrate the system using sampling of the RF environment at known locations within the facility. Such calibration can provide improved accuracy to the system, and compensate for undesirable effects, such as multi-path reflections and the refraction of radio waves around objects within the facility.

In connection with the calibration of such systems, the initial calibration can be time consuming and require considerable attention of installation employees. Further, facilities such as warehouses and manufacturing plants may have a changing RF environment because of modifications performed within the facility to accommodate changes in production or changes in the goods stored within the facility.

It is an object of the present invention to provide new and improved methods and systems for calibrating location systems based on RF signals, both during the initial installation thereof and when recalibration is necessary or desirable.

SUMMARY OF THE INVENTION

In accordance with the invention there is provided a method for calibrating a location system based on RF signals in a facility. According to the method identification devices are provided at selected locations in the facility. The RF environment is sampled at a plurality of the selected locations. Data representing the sample RF environment and corresponding selected location is signaled to a computer. The computer maintains a database collating the RF environment data and the selected locations, and the computer utilizes the database to calibrate the location system.

In one exemplary embodiment of the present invention, the identification devices are bar code labels which encode their particular selected location. The sampling includes reading the bar code data with a portable bar code reader. This signaling comprises sending the bar code data and the sampled RF environment data from the portable bar code reader via RF data communications. In another exemplary embodiment of the present invention, the identification devices are RFID tags which encode their particular selected location. The sampling includes reading the RFID tag data with a portable RFID tag reader. The signaling comprises sending the RFID tag data and the sampled RF environment data from the portable RFID tag reader via RF data communications. In yet another exemplary arrangement the identification device is an RF communication device for communicating with one or more fixed communication devices in the facility. The RF environment is sampled by sampling transmissions received from the RF communication devices on the identification device. Alternatively, the identification device can perform sampling of the RF environment by sampling transmissions received by the RF communications device of the identification device. Data representing the sample RF environment can be signaled to the computer using the RF communication device on the identification device.

In accordance with the invention there is provided a system for calibrating a location system based on RF signals at the facility. The system includes identification devices placed at selected locations in the facility. A receiver is provided for sampling the RF environment at a plurality of the selected locations in the facility. A computer receives data representing a sample RF environment and the corresponding selected locations in the facility. The computer is programmed to maintain a database corrolating the RF environment data and the selected fixed locations and calibrates the location system using the database.

The identification devices can be bar code labels encoding the selected locations. The receiver is provided on a portable bar code reader, which includes an RF data communications radio and is arranged to send data representing the fixed bar code location and identification data and the RF environmental data to the computer by RF data communications.

In yet another exemplary arrangement, the identification device comprises RF communications device for communicating with one or more fixed communications devices in the facility. Sampling the RF data comprises sampling transmissions received by the identification device from the fixed communications devices. Alternatively the RF communications devices are arranged to sample transmissions received from the identification device. The identification device may be arranged to send data representing the sampled RF environment using the RF communications device therein.

For a better understanding of the present invention, together with other and further objects, reference is made to the following description, taken in conjunction with the accompanying drawings, and its scope will be pointed out in the appended claims.

DETAILED DESCRIPTION OF THE PREFERRED EMBODIMENTS

Figure 1:
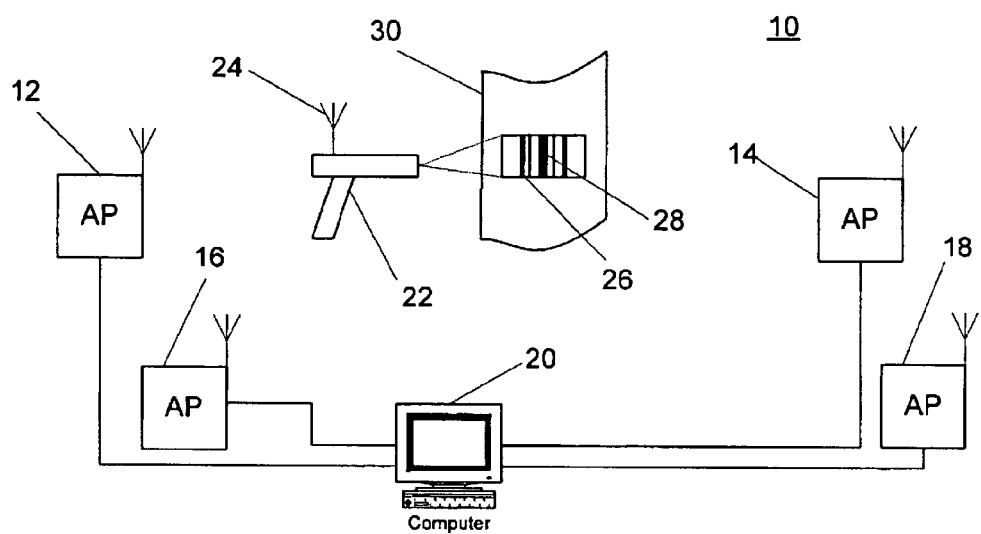
FIG. 1 is a block diagram illustrating a first embodiment of a system in accordance with the present invention.

Referring to FIG. 1 there is shown a first embodiment of a system in accordance with the present invention. The system is installed at a facility having access points 12, 14, 16 and 18 connected to a computer 20 for providing data communications from portable devices within the facility to the computer 20. The system is also arranged, in accordance with known techniques, to provide location data concerning the location of portable communications devices within the facility using, for example, time of arrival determination from radio signals used in the system. In the arrangement of FIG. 1, there is provided a portable device 22 which includes a data communications radio transmitter using antenna 24 and additionally includes a bar code reader 25. In accordance with the invention there are provided one or more barcode labels 26 at selected locations within the facility having one or more bar codes 28 thereon which are readable by portable device 22. The bar code labels 26 may be placed on columns 30 within a warehouse, distribution center, manufacturing facility, retails store, airport, or any other such large facility having known locations, or upon walls or other fixed features of the facility. In accordance with known techniques the location of bar code reader 28 can be determined by either sampling the signals received by access points 12, 14, 16 and 18 that are emitted by portable device 22, or alternatively by sampling signals emitted by access points 12, 14, 16 and 18 that are received by portable device 22. Such sampling of RF signals in either direction is herein referred to as "sampling the RF environment."

The system of the present invention is arranged to provide calibration of a locating system using RF signaling. In particular label 26 having optically readable bar code 28 is placed in a fixed, known location within the facility. Bar code 28 encodes identification data which is correlated to the fixed, known location stored in computer 20 or may have identification & location information encoded in the barcode.

For purposes of calibrating the location functions of the system, device 22 is used to read bar code 28, thereby determining the location of device 22 within the facility by use of a fixed reference point comprising label 26. The RF environment of device 22 is contemporaneously sampled to determine the characteristics of the RF environment at the particular location. Data representing the bar code read from label 26 and the RF environment is relayed to computer 20 by device 22 by signaling using antenna 24. This data is maintained in a database in computer 20 correlating the physical locations of labels 26, as previously determined, with the RF environment data received by device 22 and relayed to computer 20 through the data communications system, which may be a data communications system which is compatible with the 802.11 protocol, the Bluetooth protocol, or any other wireless data communications protocol.

Figure 2:
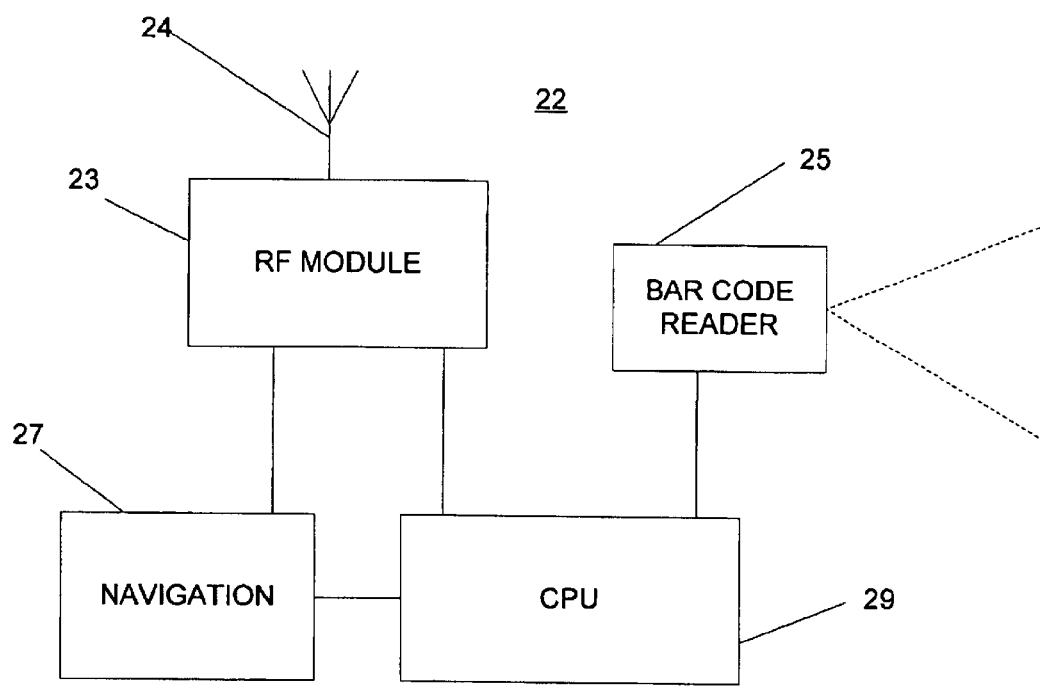
FIG. 2 is a block diagram of the bar code reading and data communications device 22 used in the system of FIG. 1.

Computer 20 can analyze the RF environment data and fixed location data represented by bar code 28 to calibrate the location environment of the system and thereby improve the accuracy of location of device 22 or other devices used in the system that use the RF environment for location purposes. This process allows the system to be re-configured on a continuous basis in real-time. Referring to FIG. 2 there is shown a block diagram of device 22, which includes a bar code reader 25, of conventional design, a central processing unit 29 and an RF module 23. Navigation from the device is determined using signals from the RF module, which represents either signals received from access points 12, 14, 16 and 18, and their respective timing, or alternatively location data determined by computer 20 in response to signals sent from RF module 23 over antenna 24, which are analyzed in computer 20 and transmitted as location data to device 22 using RF module 23. The navigation function 27 may preferably be performed using software within the central processing unit 29, but may be performed by a separate data processing device, such as a stand alone data processor.

Figure 3:
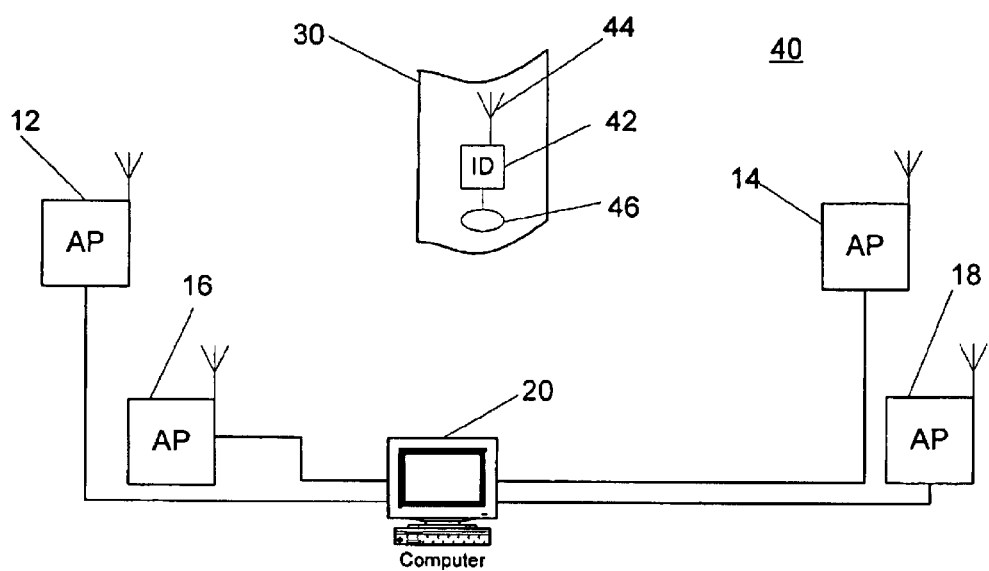
FIG. 3 is a block diagram illustrating a second embodiment of a system in accordance with the present invention.

FIG. 3 illustrates an alternate embodiment of a system according to the present invention. The system of FIG. 3 includes identical access points 12, 14, 16 and 18 which are connected to computer 20. The identification device for calibrating the system in the embodiment of FIG. 3 comprises an RF communication and identification device 42 which includes an antenna 44 and which is placed at a fixed location within the facility, such as mounted to column 30. Conveniently the identification device 42 may be battery powered or may be plugged into an AC outlet 46 to provide power thereto. The identification device 42 comprises a normally mobile unit according to the signaling data communications convention used in the facility, such as a mobile unit of an 802.11 system or other wireless system. The identification device 42 may provide the function of calibrating the location functions of the RF data communications system. This may be achieved by sampling the RF environment characteristics using signals received from access points 12, 14, 16 and 18 by device 42, and in particular either the time of arrival of such signals or the relative signal strength (RSSI) of the signals, and relaying the resulting time of arrival or RSSI data to computer 20 using the data communications functions of the system.

Alternately device 42 can periodically provide signals which are received by access points 12, 14, 16 and 18 and provided to computer 20, thereby to analyze the RF transmission from device 42 to the various access points of known location and to thereby determine the RF environment of device 42.

Figure 4:
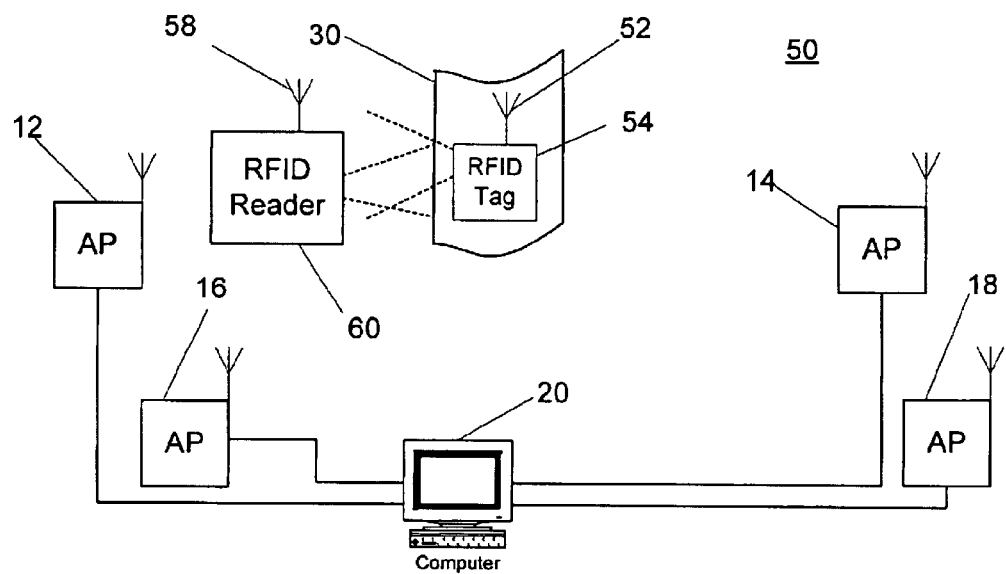
FIG. 4 is a block diagram illustrating yet another embodiment of a system in accordance with the present invention.

FIG. 4 illustrates yet another alternate embodiment of a system according to the present invention. The system of FIG. 4 includes identical access points 12, 14, 16 and 18 which are connected to computer 20. The identification device for calibrating the system in the embodiment of FIG. 4 comprises an RFID communication and identification device, such as an RFID tag 54, which includes an antenna 52 and which is placed at a fixed location within the facility, such as mounted to column 30. For purposes of calibrating the location functions of the system, a system comprising RF communications apparatus and RFID reader 60 is used to communicate with RFID tag 54, thereby determining the location of device 54 within the facility from the RFID tag data. The RF environment in the vicinity of RFID tag 54 is contemporaneously sampled by RFID reader 60 to determine RF at the particular location. Data read from RFID tag 54 and corresponding data related to the RF environment at the particular location is relayed to computer 20 by portable system 60 by signaling using antenna 58. The data is maintained in a database in computer 20 correlating the physical locations of RFID tags 54, as previously determined, with the RF environment data received by device 60 and relayed to computer 20 through the data communications system. In a similar manner as described in FIG. 1, the RF environment of the location in the system can be calibrated to improve RF accuracy at the particular location.

While there have been described what are believed to be the preferred embodiment of the present invention, those skilled in the art will recognize that other and further change may be made thereto without departing from the spirit of the invention, and it is intended to claim all such changes and modifications as fall within the scope of the invention.

I claim:

1. A method for calibrating a location system based on RF signals at a facility, comprising:

placing one or more identification devices at selected locations in said facility;

reading information from said one or more identification devices, said reading performed by a portable device;

sampling the RF environment at a plurality of said selected locations in said facility, said sampling step performed by said portable device;

signaling data representing said sampled RF environment and corresponding selected location in said facility to a computer;

maintaining a database in said computer correlating said RF environment data and said information and said selected locations; and using said database to calibrate said location system.

2. A method as specified in claim 1 wherein said one or more identification devices includes an RF communication device for communicating with one or more fixed communications devices in said facility, and wherein sampling said RF environment comprises sampling transmissions received from said RF communications device on said one or more identification devices.

3. A method as specified in claim 1 wherein said one or more identification devices comprise RFID tags encoding data representing said selected location, and wherein said sampling includes reading said RFID tag data with a portable RFID tag reading device, and wherein said signaling comprises sending said RFID tag data and said sampled RF environment data from said portable RFID tag reading device by RF data communication.

4. A method as specified in claim 1 wherein said one or more identification devices includes an RF communication device for communicating with one or more fixed communications devices in said facility, and wherein sampling said RF environment comprises sampling transmissions received by said RF communications device on said identification device.

5. A method as specified in claim 4 wherein said signaling comprises sending data representing said sampled RF environment using said RF communications device on said one or more identification devices.

6. A system for calibrating a location system based on RF signals at a facility, comprising:
    one or more identification devices at selected locations in said facility;
    one or more portable devices for reading information from said one or more identification devices;
    a receiver for sampling the RF environment at a plurality of said selected locations in said facility; and
    a computer for receiving data representing said sampled RF environment and corresponding selected location in said facility;
    wherein said computer is programmed to maintain a database correlating said RF environment data and said selected locations, and calibrate said location system using said database.

7. A system as specified in claim 6 wherein said one or more identification devices comprise RFID tags encoding said selected location, and wherein said receiver is provided on a portable RFID tag reader, and wherein said portable RFID tag reader includes an RF data communications radio and is arranged to send data representing said RFID tag location data and said RF environment data to said computer by RF data communication.

8. A system as specified in claim 6 wherein said one or more identification devices comprise RF communication devices for communicating with one or more fixed communications devices in said facility, and wherein sampling said RF environment comprises sampling transmissions received by said one or more identification devices from said fixed communications devices.

9. A system as specified in claim 8 wherein said one or more identification devices are arranged to send data representing said sampled RF environment using said RF communications devices.

10. A system as specified in claim 6 wherein said one or more identification devices include one or more RF communication devices for communicating with one or more fixed communications devices in said facility, and wherein said RF communication devices are arranged to sample transmissions received from said one or more identification devices.

11. A system as specified in claim 10 wherein said one or more identification devices are arranged to send data representing said sampled RF environment using said RF communications devices.

12. A method for calibrating a location system based on RF signals at a facility, comprising:
    placing one or more identification devices at selected locations in said facility;
    sampling the RF environment at a plurality of said selected locations in said facility;
    signaling data representing said sampled RF environment and corresponding selected location in said facility to a computer;
    maintaining a database in said computer correlating said RF environment data and said selected locations; and
    using said database to calibrate said location system;
    wherein said one or more identification devices comprise bar code labels encoding data representing said selected location, and wherein said sampling includes reading data from said bar code labels with a portable bar code reader, and wherein said signaling comprises sending said bar code data and said sampled RF environment data from said portable bar code reader by RF data communication.

13. A system for calibrating a location system based on RF signals at a facility, comprising:
    one or more identification devices at selected locations in said facility;
    a receiver for sampling the RF environment at a plurality of said selected locations in said facility; and
    a computer for receiving data representing said sampled RF environment and corresponding selected location in said facility;
    wherein said computer is programmed to maintain a database correlating said RF environment data and said selected locations and calibrate said location system using said database, and further wherein said one or more identification devices comprise bar code labels encoding said selected location, wherein said receiver is provided on a portable bar code reader, and wherein said portable bar code reader includes an RF data communications radio and is arranged to send data representing said bar code location data and said RF environment data to said computer by RF data communication.

* * * * *